United States Patent
Yoshimura et al.

(10) Patent No.: US 12,240,391 B2
(45) Date of Patent: Mar. 4, 2025

(54) GROMMET

(71) Applicants: Yazaki Corporation, Tokyo (JP); TOYOTA JIDOSHA KYUSHU KABUSHIKI KAISHA, Miyawaka (JP)

(72) Inventors: Katsuya Yoshimura, Aichi (JP); Shohei Shirota, Fukuoka (JP)

(73) Assignees: YAZAKI CORPORATION, Tokyo (JP); TOYOTA JIDOSHA KYUSHU KABUSHIKI KAISHA, Miyawaka (JP)

( * ) Notice: Subject to any disclaimer, the term of this patent is extended or adjusted under 35 U.S.C. 154(b) by 117 days.

(21) Appl. No.: 18/356,628

(22) Filed: Jul. 21, 2023

(65) Prior Publication Data

US 2024/0042949 A1    Feb. 8, 2024

(30) Foreign Application Priority Data

Aug. 4, 2022    (JP) .................................. 2022-124419

(51) Int. Cl.
*B60R 16/02*    (2006.01)
*H02G 3/22*    (2006.01)
*H02G 15/013*    (2006.01)

(52) U.S. Cl.
CPC ................................ *B60R 16/0222* (2013.01)

(58) Field of Classification Search
CPC ..... H02G 15/013; H02G 3/22; B60R 16/0222
See application file for complete search history.

(56) References Cited

U.S. PATENT DOCUMENTS

| | | | |
|---|---|---|---|
| 2011/0073350 A1* | 3/2011 | Okuhara | B60R 16/0222 174/152 G |
| 2011/0079417 A1* | 4/2011 | Okuhara | B60R 16/0222 174/152 G |
| 2017/0179703 A1* | 6/2017 | Kominato | H01B 7/0045 |
| 2020/0079303 A1* | 3/2020 | Yoshimura | B60R 16/0222 |
| 2023/0115622 A1* | 4/2023 | Ji | B60R 16/0222 174/153 G |

FOREIGN PATENT DOCUMENTS

| | | |
|---|---|---|
| JP | 2021-087286 A | 6/2021 |
| JP | 2021-087287 A | 6/2021 |
| JP | 2021-087288 A | 6/2021 |

* cited by examiner

*Primary Examiner* — Hoa C Nguyen
*Assistant Examiner* — Amol H Patel
(74) *Attorney, Agent, or Firm* — Sughrue Mion, PLLC

(57) ABSTRACT

A grommet includes: an engagement body; a first cylindrical body; a second cylindrical body; a first partition wall; a second partition wall; a holding part fixed together with a wiring material; and a pair of projection parts projected from an inner wall of the first partition wall. The first cylindrical body and the first partition wall are deformed in a pulling direction of the wiring material in a loaded state. An end part of the projection part is disposed, to be opposed to an inner peripheral surface on an inner side in the radial direction with respect to a groove bottom of an engagement groove of the engagement body, and acts pressing force on an inner peripheral surface of the engagement body from an end part due to displacement caused by deformation from an inner peripheral part side of the first partition wall in the loaded state.

4 Claims, 6 Drawing Sheets

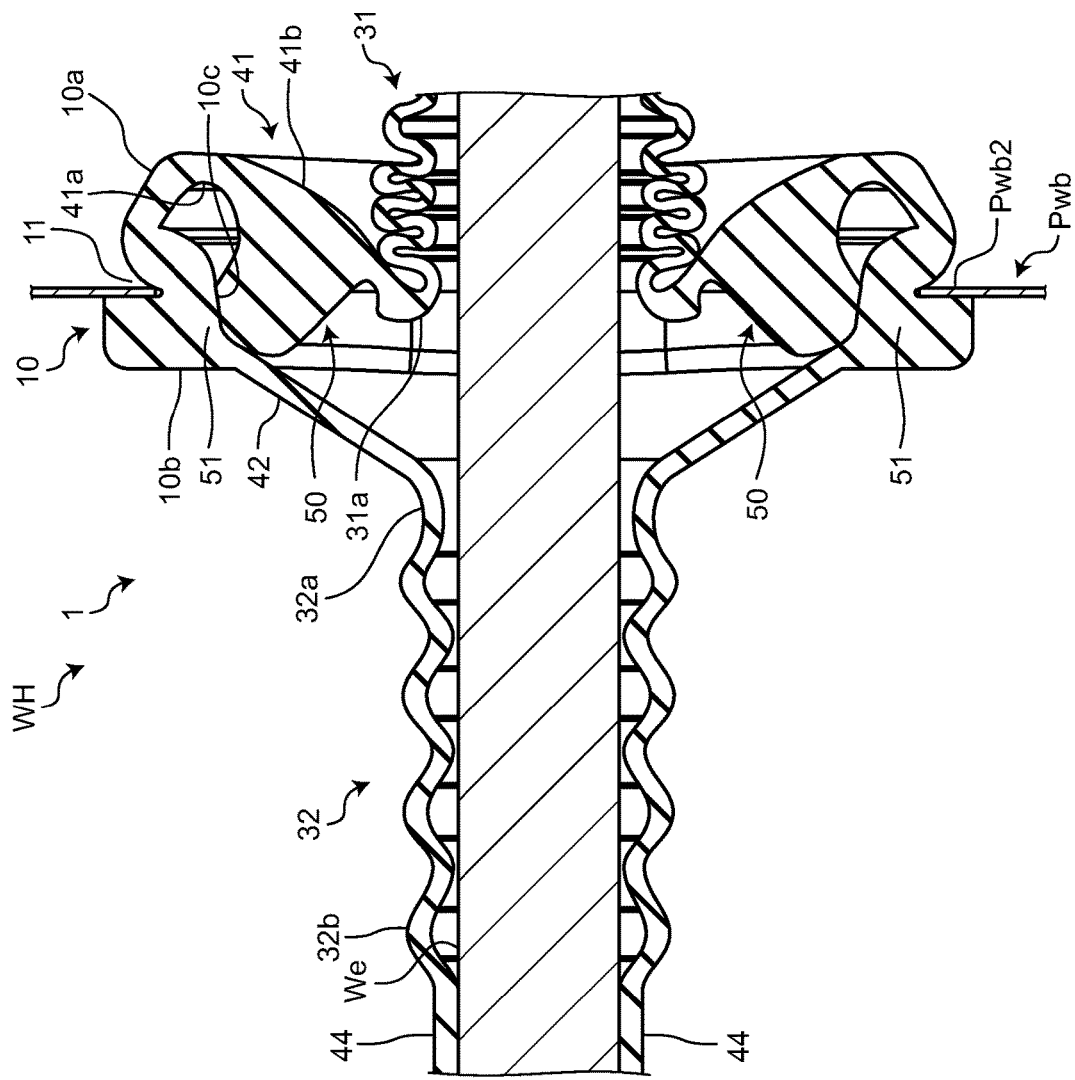

GROMMET

CROSS-REFERENCE TO RELATED APPLICATION(S)

The present application claims priority to and incorporates by reference the entire contents of Japanese Patent Application No. 2022-124419 filed in Japan on Aug. 4, 2022.

BACKGROUND OF THE INVENTION

1. Field of the Invention

The present invention relates to a grommet.

2. Description of the Related Art

Conventionally, at the time of causing a wiring material such as an electric wire to pass through a through hole between two spaces, a grommet may be disposed for protecting the wiring material from a peripheral part of the through hole. The grommet may be caused to have a liquid-proof property to prevent liquid such as water from moving between the two spaces. The grommet includes a main body to be engaged with a peripheral part of a through hole of a wall body, a first cylindrical body that is projected from one opening peripheral part of the main body coaxially with the main body and through which a wiring material is inserted, a second cylindrical body that is projected from the other opening peripheral part of the main body coaxially with the main body and through which the wiring material is inserted, and a holding part that is projected from the second cylindrical body and fixed by tape together with the wiring material drawn out from the second cylindrical body. For example, a grommet of such a type is disclosed in Japanese Patent Application Laid-open No. 2021-87286, Japanese Patent Application Laid-open No. 2021-87287, and Japanese Patent Application Laid-open No. 2021-87288.

Regarding the grommet in the related art, the first cylindrical body is pulled in one space while the main body is engaged with the peripheral part of the through hole of the wall body. An engaged state of the grommet is maintained by locking an inner projection to an inner wall in the vicinity of the peripheral part of the through hole of the wall body in the main body in the engaged state. On the other hand, in this grommet, the engaged state of the main body needs to be maintained even in a case in which the wiring material is accidentally pulled in the other space.

SUMMARY OF THE INVENTION

Thus, the present invention aims at providing a grommet that may improve holding force with respect to a peripheral part of a through hole.

In order to achieve the above mentioned object, a grommet according to one aspect of the present invention includes an annular engagement body disposed in a through hole through which a wiring material is passed between a first space and a second space, the engagement body on which an annular engagement groove is disposed to be fitted to a peripheral part of the through hole from an inner diameter side; a first cylindrical body that is formed in a bellows-like cylindrical shape having a smaller diameter than that of the engagement body, and disposed coaxially with an axis of the engagement body in the first space, the first cylindrical body through which the wiring material is inserted; a second cylindrical body that is formed in a cylindrical shape having a smaller diameter than that of the engagement body, and disposed coaxially with the axis in the second space, the second cylindrical body through which the wiring material is inserted; a first partition wall having an annular shape that closes an annular opening between an annular end part on the first space side of the engagement body and one annular end part of the first cylindrical body; a second partition wall having an annular shape that closes an annular opening between an annular end part on the second space side of the engagement body and one annular end part of the second cylindrical body; a holding part that is projected from the other annular end part of the second cylindrical body, and fixed by tape together with the wiring material drawn out from the other annular end part of the second cylindrical body; and a pair of projection parts that are projected from an inner wall of the first partition wall toward the second partition wall, and disposed to be opposed to each other across an axis of the first partition wall, wherein the first cylindrical body and the first partition wall are deformed while relatively moving with respect to the engagement body in a pulling direction in a loaded state in which the wiring material is pulled along the axis together with the holding part and the second cylindrical body in the second space, the projection part is disposed so that an end part on the second partition wall side is disposed, with a gap on an inner side in a radial direction, to be opposed to an annular inner peripheral surface on an inner side in the radial direction with respect to a groove bottom of the engagement groove in the engagement body in a no-load state in which the wiring material is not pulled, and causes pressing force to act on the inner peripheral surface of the engagement body from the end part on the second partition wall side due to displacement caused by deformation from an inner peripheral part side of the first partition wall in the loaded state, and the first cylindrical body causes assisting force for enhancing the pressing force of the projection part to act on an external wall of the first partition wall in the loaded state.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a partial enlarged view corresponding to the cross section along the line X-X in FIG. 2, and illustrates the grommet after being deformed.

DETAILED DESCRIPTION OF THE PREFERRED EMBODIMENTS

The following describes an embodiment of a grommet according to the present invention in detail based on the drawings. The present invention is not limited to this embodiment.

Embodiment

The following describes an embodiment of the grommet according to the present invention based on FIG. 1 to FIG. 6.

Figure 1:
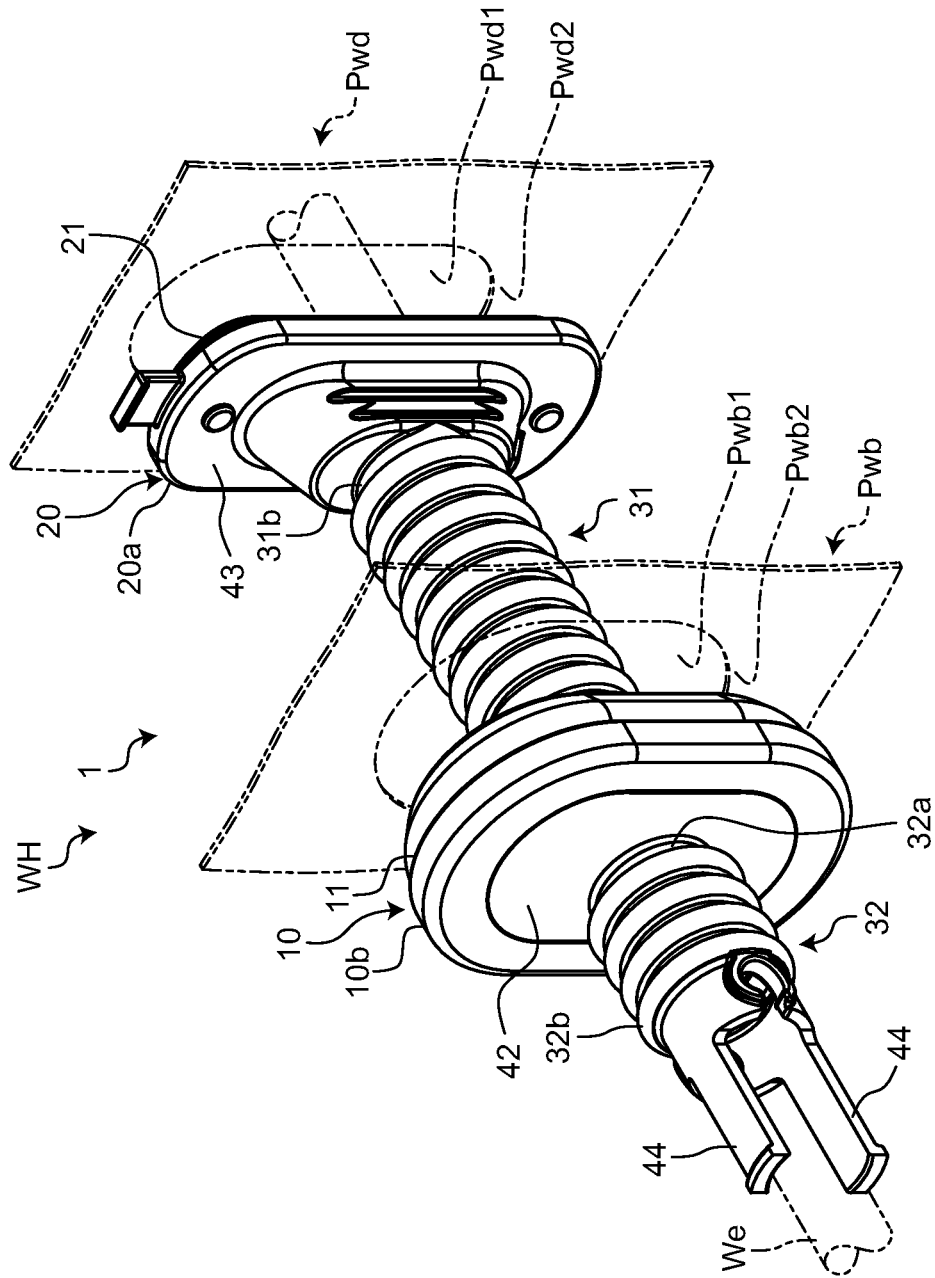
FIG. 1 is a perspective view illustrating a grommet according to an embodiment before being attached.

The reference numeral 1 in FIG. 1 to FIG. 6 denotes the grommet according to the present embodiment. The grommet 1 is disposed at a through hole through which a wiring material We is passed (hereinafter, referred to as a "wiring material insertion hole") between two spaces, protects the wiring material We from a peripheral part of the wiring material insertion hole on a wall body between the two spaces, and prevents liquid such as water from moving between the two spaces via a gap between the peripheral part and the wiring material We. The wiring material We exemplified herein is passed through a wiring material insertion hole of a first wall body Pwb (hereinafter, referred to as a "first wiring material insertion hole") Pwb1 between a first space and a second space, passed through a wiring material insertion hole of a second wall body Pwd (hereinafter, referred to as a "second wiring material insertion hole") Pwd1 between the first space and a third space, and routed across the second space and the third space via the first space (FIG. 1). Thus, the grommet 1 exemplified herein is formed to protect the wiring material We from a peripheral part Pwb2 of the first wiring material insertion hole Pwb1 of the first wall body Pwb and secure a liquid-proof property between the peripheral part Pwb2 and the wiring material We, and protect the wiring material We from a peripheral part Pwd2 of the second wiring material insertion hole Pwd1 of the second wall body Pwd and secure a liquid-proof property between the peripheral part Pwd2 and the wiring material We (FIG. 1). The grommet 1 is formed of an elastic material such as an elastomer.

Figure 2:
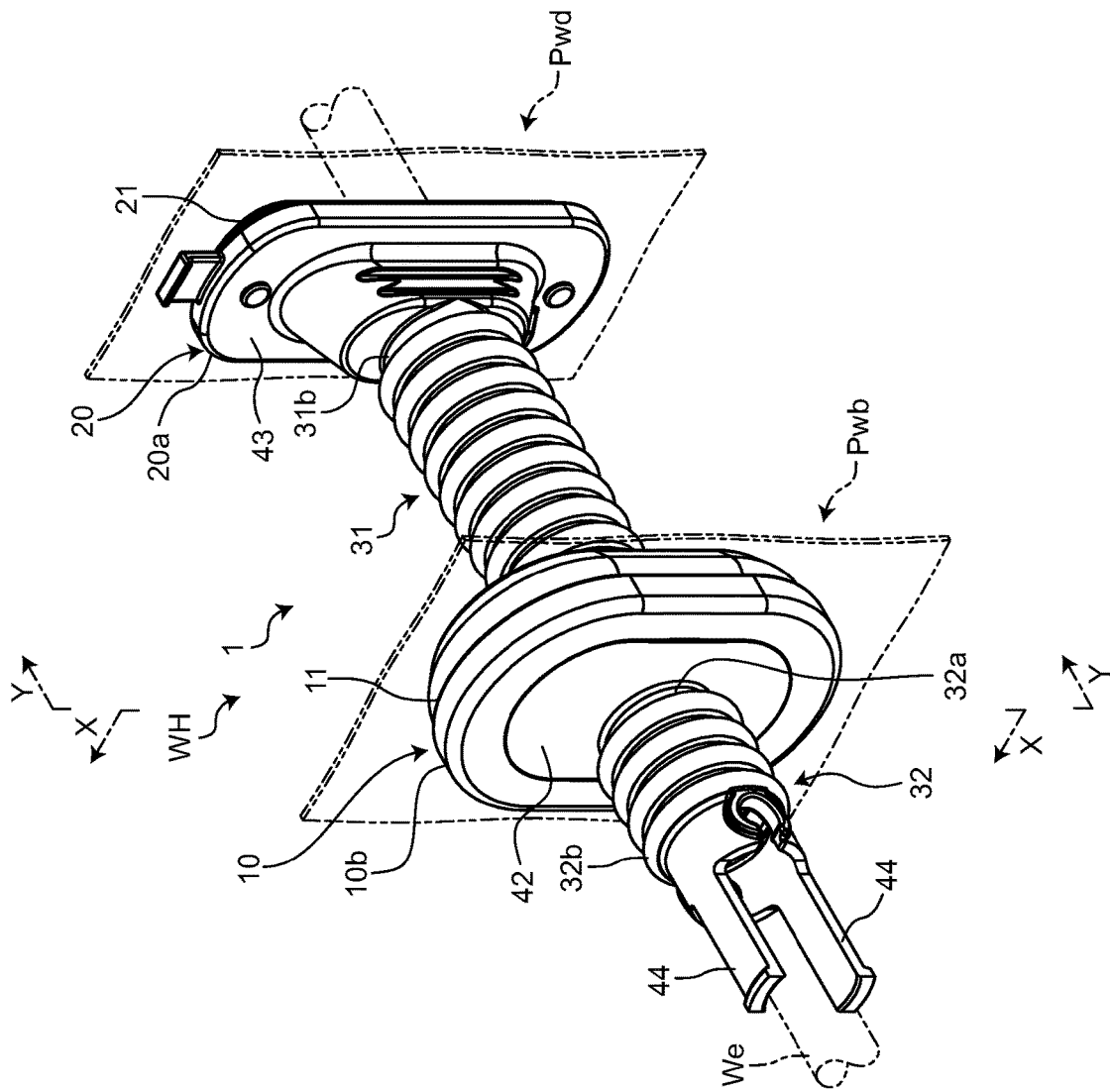
FIG. 2 is a perspective view illustrating the grommet according to the embodiment after being attached.

Herein, the wiring material We is, for example, an electric wire (an electric wire as a communication line, an electric wire as a power supply line, and the like) or a bundle of a plurality of electric wires. In a case in which the wiring material We includes a plurality of electric wires, the electric wires are bundled by using an exterior component such as a corrugated tube and resin tape, for example. Herein, the grommet 1 and the wiring material We assembled to each other are referred to as a wire harness WH (FIG. 1 and FIG. 2).

The wire harness WH is, for example, routed across a vehicle body side and a movable component side of a vehicle, and used for communication or power supply therebetween. The movable component is, for example, a component coupled to a vehicle body via a movable coupling component such as a hinge, that is, a back door, a side door for a front seat or a rear seat, a trunk lid, and the like. Comparing to this example, herein, the first wall body Pwb is assumed to be the wall body on the vehicle body side, and the second wall body Pwd is assumed to be the wall body on the movable component side.

The grommet 1 includes an annular engagement body (hereinafter, referred to as a "first engagement body") 10 disposed in the first wiring material insertion hole Pwb1, the engagement body on which an annular engagement groove 11 is disposed to be fitted to the peripheral part Pwb2 of the first wiring material insertion hole Pwb1 from an inner diameter side (FIG. 1 to FIG. 4). The first engagement body 10 is formed in a circular shape or an oval ring shape (a long circular shape or an elliptic circular shape) matching the shape of the first wiring material insertion hole Pwb1. The engagement groove 11 is formed in the same shape as that of the first engagement body 10.

The first wall body Pwb described herein includes the first wiring material insertion hole Pwb1 formed in a long circular shape and the peripheral part Pwb2. Due to this, the first engagement body 10 is formed in a long circular shape concentric with the first wiring material insertion hole Pwb1. The engagement groove 11 having a long circular shape that matches the shape of the peripheral part Pwb2 and is concentric with the peripheral part Pwb2 is formed on the first engagement body 10. The first engagement body 10 is projected toward the first space side and the second space side in a state in which the engagement groove 11 is engaged with the peripheral part Pwb2 of the first wiring material insertion hole Pwb1.

Figure 3:
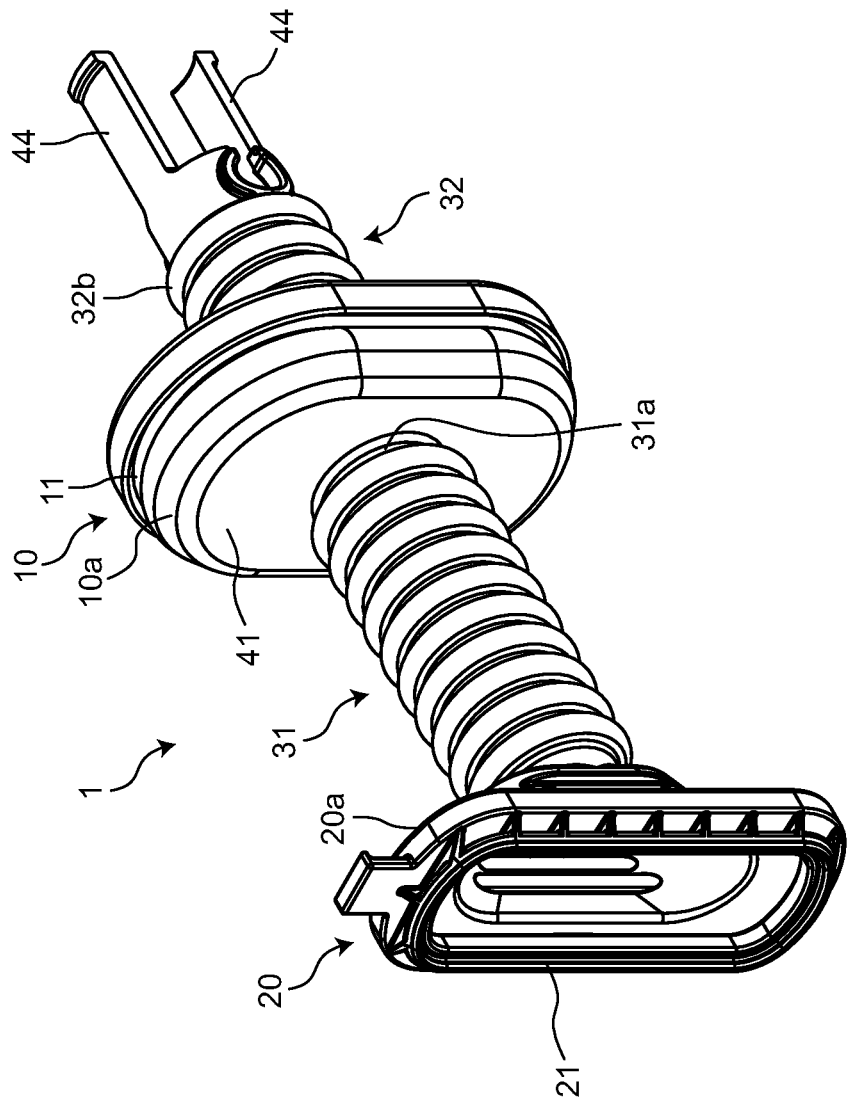
FIG. 3 is a perspective view of the grommet according to the embodiment viewed from another angle.

The grommet 1 also includes an annular engagement body (hereinafter, referred to as a "second engagement body") 20 that is disposed in the second wiring material insertion hole Pwd1, and includes an opening end part 21 to be fitted to the peripheral part Pwd2 of the second wiring material insertion hole Pwd1 (FIG. 1 to FIG. 3). The second engagement body 20 is formed in a circular shape or an oval ring shape (a long circular shape or an elliptic circular shape) matching the shape of the second wiring material insertion hole Pwd1. In the grommet 1, the inner wiring material We is drawn out from the opening end part 21 of the second engagement body 20 to the third space.

The second wall body Pwd described herein includes the second wiring material insertion hole Pwd1 formed in a long circular shape and the peripheral part Pwd2. Due to this, the second engagement body 20 is formed in a long circular shape concentric with the second wiring material insertion hole Pwd1, and the opening end part 21 having a long circular shape is fitted to the peripheral part Pwd2 of the second wiring material insertion hole Pwd1.

The grommet 1 also includes a first cylindrical body 31 through which the wiring material We is inserted, the first cylindrical body 31 being formed in a bellows-like cylindrical shape having a smaller diameter than that of the first engagement body 10 and disposed coaxially with an axis of the first engagement body 10 in the first space (FIG. 1 to FIG. 4). With respect to the second engagement body 20, the first cylindrical body 31 is formed in a bellows-like cylindrical shape having a smaller diameter than that of the second engagement body 20, and disposed coaxially with an axis of the second engagement body 20 in the first space. The first cylindrical body 31 covers and hides the wiring material We routed in the first space between the first engagement body 10 and the second engagement body 20, and can be expanded, contracted, or bent therebetween. The first cylindrical body 31 described herein is formed in a cylindrical bellows-like shape.

The grommet 1 also includes a second cylindrical body 32 through which the wiring material We is inserted, the second cylindrical body 32 being formed in a cylindrical shape having a smaller diameter than that of the first engagement body 10 and disposed coaxially with the axis of the first engagement body 10 in the second space (FIG. 1 to FIG. 4). In the grommet 1, the inner wiring material We is drawn out from the second cylindrical body 32 to the second space. The second cylindrical body 32 described herein is formed in a cylindrical bellows-like shape.

The grommet 1 also includes a first partition wall 41 having an annular shape that closes an annular opening between an annular end part 10a on the first space side of the first engagement body 10 and one annular end part 31a of the first cylindrical body 31, and a second partition wall 42 having an annular shape that closes an annular opening between an annular end part 10b on the second space side of the first engagement body 10 and one annular end part 32a of the second cylindrical body 32 (FIG. 1 to FIG. 4). The grommet 1 further includes a third partition wall 43 having an annular shape that closes an annular opening between an annular end part 20a on the first space side of the second engagement body 20 and the other annular end part 31b of the first cylindrical body 31 (FIG. 1 and FIG. 2).

The grommet 1 also includes a holding part 44 that is projected from the other annular end part 32b of the second cylindrical body 32, and fixed by tape such as resin tape (not illustrated) together with the wiring material We drawn out from the other annular end part 32b (FIG. 1 to FIG. 4). The holding part 44 is formed as an arc-shaped piece body that can be elastically deformed the axis of which extends along a cylinder axis direction of the second cylindrical body 32, and disposed so that an inner peripheral surface thereof faces the wiring material We drawn out from the other annular end part 32b. Two holding parts 44 are disposed so that inner peripheral surfaces thereof are opposed to each other. After the wiring material We is drawn out from the other annular end part 32b, tape is wound around the wiring material We and the two holding parts 44 multiple times from the outer peripheral surface side, and the wiring material We is held by the two holding parts 44.

In the grommet 1, in a loaded state in which the wiring material We is pulled along the axis together with the holding part 44 and the second cylindrical body 32 in the second space, the first cylindrical body 31 and the first partition wall 41 are deformed while relatively moving with respect to the first engagement body 10 in a pulling direction. The first cylindrical body 31 contracts while relatively moving in the pulling direction with respect to the first engagement body 10 in the loaded state. An inner peripheral part of the first partition wall 41 is connected to the one annular end part 31a of the first cylindrical body 31, so that the first partition wall 41 is deformed while relatively moving from the inner peripheral part side toward the second partition wall 42 in conjunction with deformation of the first cylindrical body 31.

Furthermore, in the grommet 1, the inner peripheral part of the second partition wall 42 is connected to the one annular end part 32a of the second cylindrical body 32. Due to this, when the inner peripheral part side of the second partition wall 42 is pulled in the loaded state, a tensile load thereof acts on the outer peripheral part. Thus, in the grommet 1, if the loaded state continues, the peripheral part Pwb2 of the first wiring material insertion hole Pwb1 may come off from the engagement groove 11 of the first engagement body 10.

Figure 4:
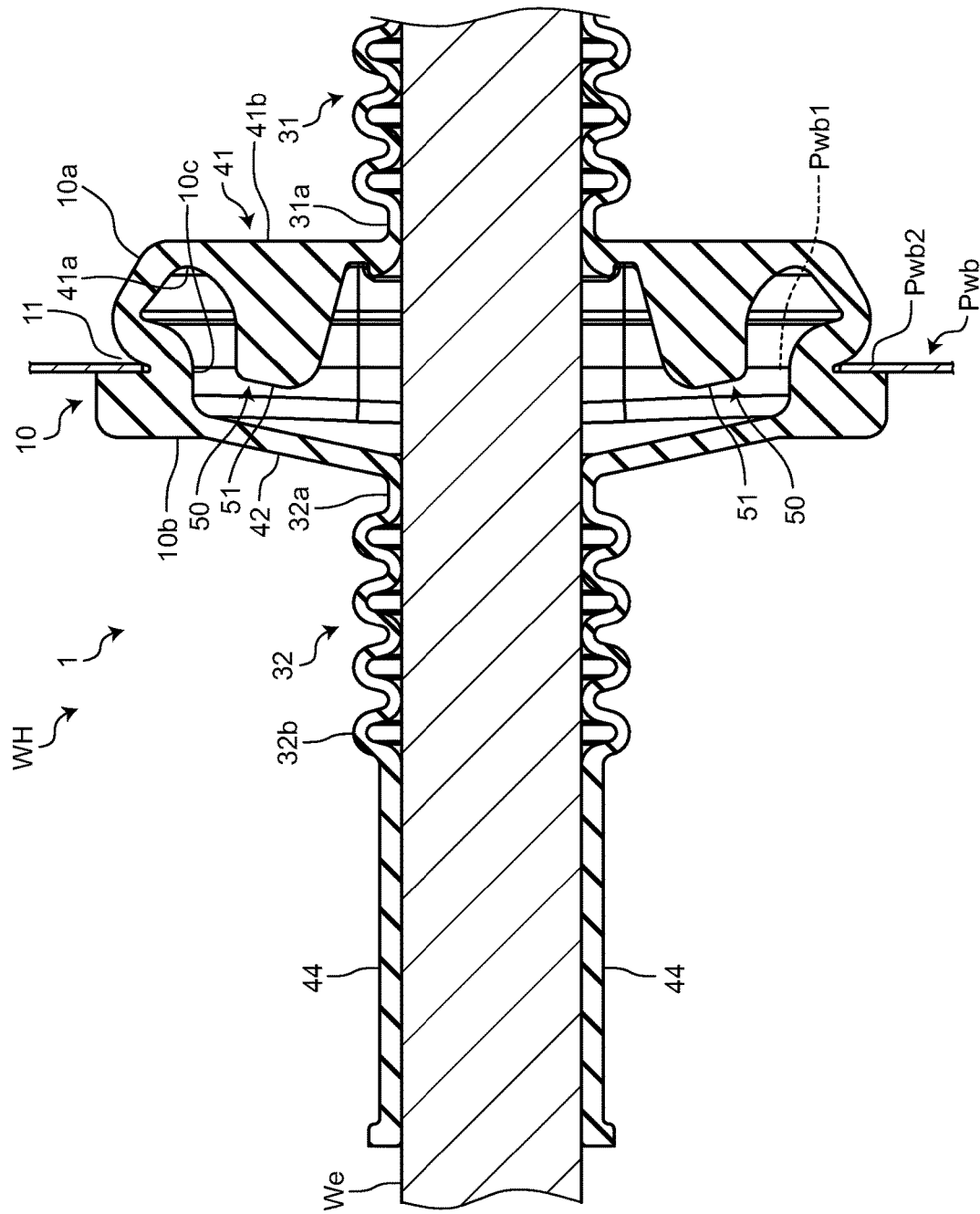
FIG. 4 is a partial enlarged view of a cross section along a line X-X in FIG. 2.
Figure 5:
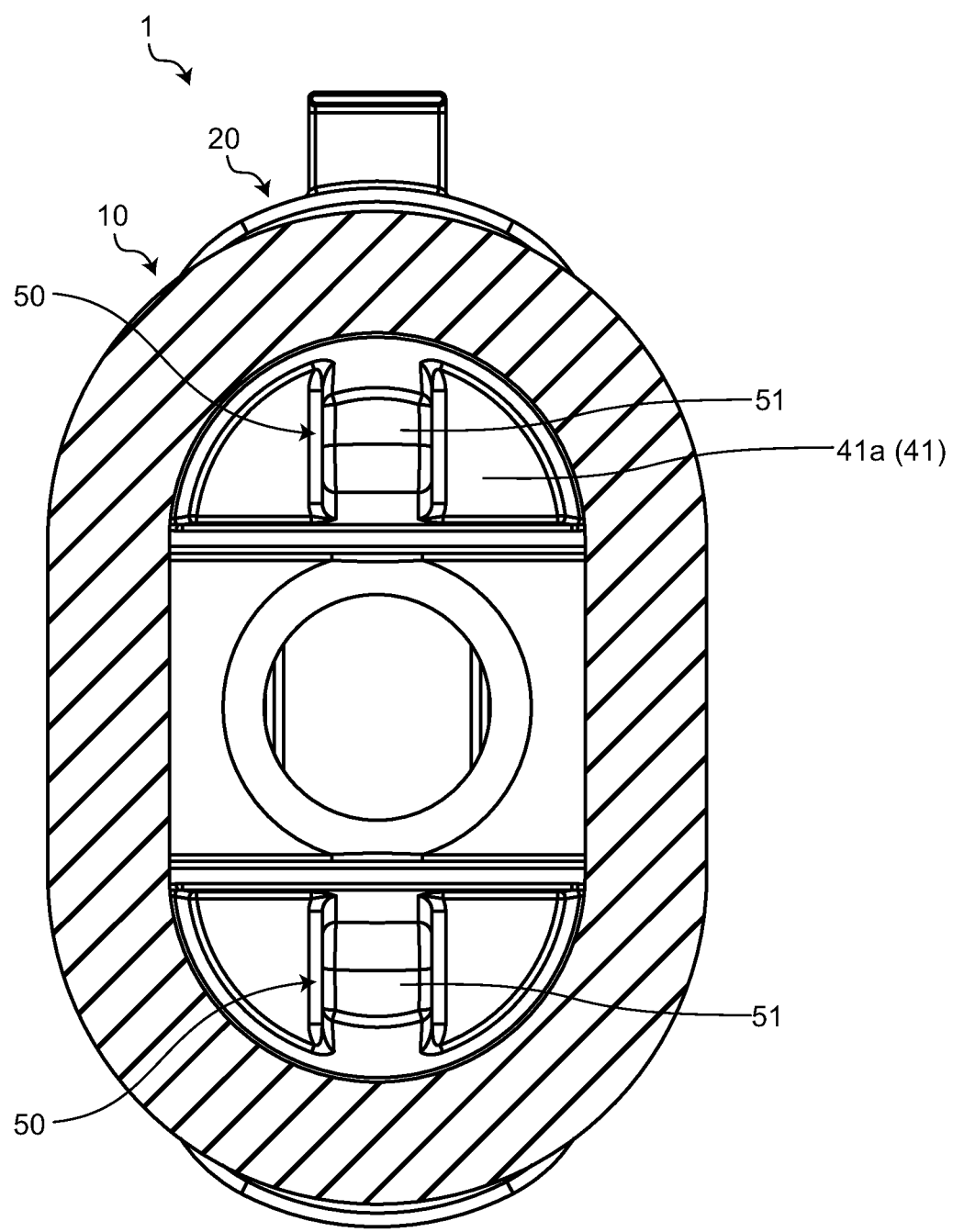
FIG. 5 is a cross-sectional view along a line Y-Y in FIG. 2.

Thus, the grommet 1 includes a pair of projection parts 50 that are projected from an inner wall 41a of the first partition wall 41 toward the second partition wall 42, and disposed to be opposed to each other across an axis of the first partition wall 41 (FIG. 4 and FIG. 5). The grommet 1 may include at least one pair of the projection parts 50. The projection part 50 is disposed so that an end part 51 on the second partition wall 42 side is disposed, with a gap on an inner side in the radial direction, to be opposed to an annular inner peripheral surface 10c on an inner side in a radial direction with respect to a groove bottom of the engagement groove 11 in the first engagement body 10 in a no-load state in which the wiring material We is not pulled (FIG. 4 and FIG. 5). The projection part 50 is formed to cause pressing force to act on the inner peripheral surface 10c of the first engagement body 10 from the end part 51 on the second partition wall 42 side due to displacement caused by deformation from the inner peripheral part side of the first partition wall 41 in the loaded state (FIG. 6). Due to this, in the grommet 1, the groove bottom of the engagement groove 11 is pressed against the peripheral part Pwb2 of the first wiring material insertion hole Pwb1 by the pressing force, so that the peripheral part Pwb2 can be held in the engagement groove 11. Thus, the grommet 1 can improve holding force of the first engagement body 10 with respect to the peripheral part Pwb2 of the first wiring material insertion hole Pwb1, and can prevent the first engagement body 10 from coming off from the first wiring material insertion hole Pwb1.

Furthermore, the grommet 1 enhances, by the first cylindrical body 31, the pressing force of the projection part 50 acting on the inner peripheral surface 10c of the first engagement body 10. The first cylindrical body 31 described herein is formed to cause assisting force for enhancing the pressing force of the projection part 50 to act on an external wall 41b of the first partition wall 41 in the loaded state (FIG. 6). Specifically, the first cylindrical body 31 is formed to contract while relatively moving in the loaded state to be locked to the external wall 41b of the first partition wall 41, and cause the pressing force as assisting force to act on the external wall 41b of the first partition wall 41 at this locked position. Due to this, in the grommet 1, the projection part 50 is sandwiched between the inner peripheral surface 10c of the first engagement body 10 and the first cylindrical body 31 in the loaded state, and the groove bottom of the engagement groove 11 is pressed against the peripheral part Pwb2 of the first wiring material insertion hole Pwb1 by the enhanced pressing force, so that the peripheral part Pwb2 can be easily held in the engagement groove 11. Thus, the grommet 1 can further improve the holding force of the first engagement body 10 with respect to the peripheral part Pwb2 of the first wiring material insertion hole Pwb1, and can enhance an effect of preventing the first engagement body 10 from coming off from the first wiring material insertion hole Pwb1.

Herein, to suppress lowering of the pressing force acting on the inner peripheral surface 10c of the first engagement body 10, the projection part 50 is formed in a shape that cannot be deformed at the time of receiving reaction force of the pressing force from the inner peripheral surface 10c of the first engagement body 10. For example, the projection part 50 is formed as a polyhedron that is depressed when being locally overloaded, but an external shape can be maintained when a tensile load or bearing stress is applied at a degree of not being ruptured.

As described above, the grommet 1 according to the present embodiment can improve the holding force of the first engagement body 10 with respect to the peripheral part Pwb2 of the first wiring material insertion hole Pwb1 in the loaded state in which the wiring material We is pulled in the second space, so that the first engagement body 10 can be prevented from coming off from the first wiring material insertion hole Pwb1.

The grommet according to the present embodiment can improve holding force of an engagement body with respect to the peripheral part of the through hole in a loaded state in which the wiring material is pulled in a second space, so that the engagement body can be prevented from coming off from the through hole.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A grommet comprising:
an annular engagement body disposed in a through hole through which a wiring material is passed between a first space and a second space, the engagement body on which an annular engagement groove is disposed to be fitted to a peripheral part of the through hole from an inner diameter side;
a first cylindrical body that is formed in a bellows-like cylindrical shape having a smaller diameter than that of the engagement body, and disposed coaxially with an axis of the engagement body in the first space, the first cylindrical body through which the wiring material is inserted;
a second cylindrical body that is formed in a cylindrical shape having a smaller diameter than that of the engagement body, and disposed coaxially with the axis in the second space, the second cylindrical body through which the wiring material is inserted;
a first partition wall having an annular shape that closes an annular opening between an annular end part on the first space side of the engagement body and one annular end part of the first cylindrical body;
a second partition wall having an annular shape that closes an annular opening between an annular end part on the second space side of the engagement body and one annular end part of the second cylindrical body;
a holding part that is projected from the other annular end part of the second cylindrical body, and fixed by tape together with the wiring material drawn out from the other annular end part of the second cylindrical body; and
a pair of projection parts that are projected from an inner wall of the first partition wall toward the second partition wall, and disposed to be opposed to each other across an axis of the first partition wall, wherein
the first cylindrical body and the first partition wall are deformed while relatively moving with respect to the engagement body in a pulling direction in a loaded state in which the wiring material is pulled along the axis together with the holding part and the second cylindrical body in the second space,
the projection part is disposed so that an end part on the second partition wall side is disposed, with a gap on an inner side in a radial direction, to be opposed to an annular inner peripheral surface on an inner side in the radial direction with respect to a groove bottom of the engagement groove in the engagement body in a no-load state in which the wiring material is not pulled, and causes pressing force to act on the inner peripheral surface of the engagement body from the end part on the second partition wall side due to displacement caused by deformation from an inner peripheral part side of the first partition wall in the loaded state, and
the first cylindrical body causes assisting force for enhancing the pressing force of the projection part to act on an external wall of the first partition wall in the loaded state.

2. The grommet according to claim 1, wherein the projection part is formed in a shape that is unable to be deformed at the time of receiving reaction force of the pressing force from the inner peripheral surface of the engagement body.

3. The grommet according to claim 2, wherein the first cylindrical body contracts while relatively moving in the loaded state to be locked to the external wall of the first partition wall, and causes the pressing force as the assisting force to act on the external wall of the first partition wall at the locked position.

4. The grommet according to claim 1, wherein the first cylindrical body contracts while relatively moving in the loaded state to be locked to the external wall of the first partition wall, and causes the pressing force as the assisting force to act on the external wall of the first partition wall at the locked position.

* * * * *